D. ARNDT.
Bee Hive.
No. 29,658.
Patented Aug. 21, 1860.
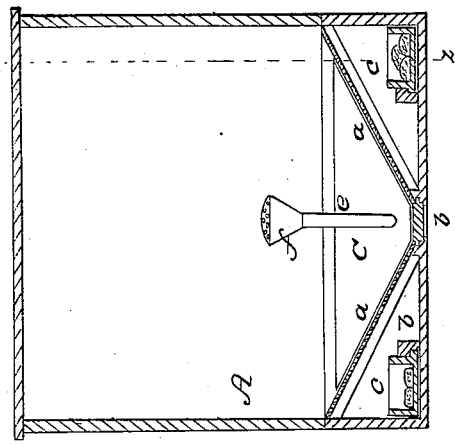
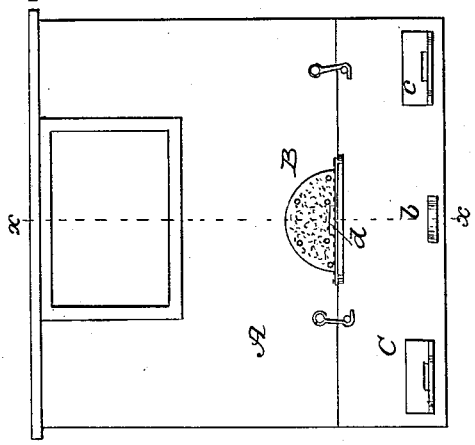
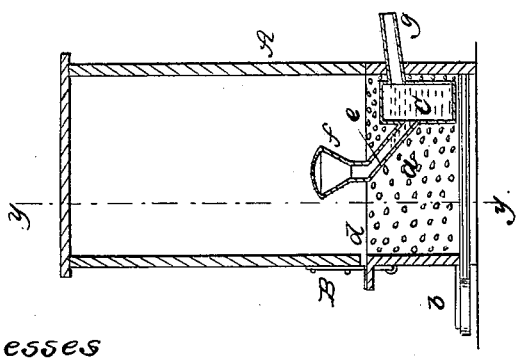

UNITED STATES PATENT OFFICE.

DANIEL ARNDT, OF ZANESVILLE, OHIO.

BEEHIVE.

Specification of Letters Patent No. 29,658, dated August 21, 1860.

*To all whom it may concern:*

Be it known that I, DANIEL ARNDT, of Zanesville, in the county of Muskingum and State of Ohio, have invented certain new and useful Improvements in Beehives; and I do hereby declare that the following is a full, clear, and exact description of the same, reference being had to the annexed drawings, making a part of this specification, in which—

Figure 1, is a vertical section of my invention, taken in the line $x$, $x$, Fig. 2. Fig. 2, a front view of the same. Fig. 3, a vertical section of the same taken in the line $y$, $y$, Fig. 1. Fig. 4, a vertical section of the same taken in the line $z$, $z$, Fig. 3.

Similar letters of reference indicate corresponding parts in the several figures.

This invention consists, 1st, in the employment or use of sand-paper, or ground glass, or angular sharp sand, placed around the entrance to bee-hives as well as within the corners of the same, and at other places where the bee moth usually deposits its eggs or passes over, in order to repel the moth from the hive or prevent its entrance into it, the moth having a great aversion to such substances.

The invention consists, 2d, in the employment or use of a water tank placed within the hive, and provided with an eduction pipe and rose, substantially as hereinafter described, for the purpose of ejecting, when desired, the bees from the hive and effect their removal to another.

To enable those skilled in the art to fully understand and construct my invention I will proceed to describe it.

A represents a bee hive, which may be of quadrilateral form, and provided with a double inclined perforated bottom $a$, $a$, as shown clearly in Fig. 3, with a slide $b$, between them at their lower ends. Below the perforated inclined bottom $a$, $a$, there is a horizontal bottom $b'$, and a slide trough or box $c$, is placed in each compartment. These troughs are filled with cork or other suitable substance saturated with honey or sweetened water in order to decoy the moth therein and entice them to deposit their eggs in the troughs and below the hive. The inclined bottom $a$ $a$, may be constructed of perforated sheet metal or wire cloth, the mesh being sufficiently fine to prevent the bees passing through, and at the same time permitting the trash of the hive to escape. The larger portions of trash and dirt may be removed by drawing out slide $b$.

Directly around the entrance orifice $d$, of the hive, sandpaper B, is placed or secured as shown clearly in Fig. 2, or ground glass or angular sand may be cemented or secured in any suitable way around the entrance. The bee moth has a great aversion to this rough, gritty surface, and will not pass over it, neither will it deposit its eggs near it, and if the moths succeed in effecting an entrance into the hive at other places, they may be prevented from depositing their eggs in the corners within the hive, or in other places by applying the sand paper or its equivalent thereto.

Within the hive A, a water tank C, is placed. This tank rests on the inclined bottom $a$, and is provided with an eduction pipe $e$, which terminates in a rose $f$. The tank is also provided with an induction pipe $g$, which extends through the back of the hive, the rose $f$ points upward in the hive, and at any time when it is desired to expel the bees therefrom a pump is applied to the end of pipe $g$, and the water ejected from the rose in a fine spray upward, the spray dislodging the bees without injuring either the comb or honey. It is not designed to deluge the interior of the hive with water. It will be understood that the rose $f$, has very fine perforations and that a small quantity of water will effect the desired result. By this means the bees may at any time be transferred from one hive to another, and old comb removed and the hives cleansed, and the bees replaced in the cleansed hive by the same means that caused their ejection.

I do not claim the moth traps formed of the sliding troughs $c$, nor do I claim the slide $b$, for such parts have been previously used, but:

I do claim as new and desire to secure by Letters Patent—

1. The employment or use of sand paper or ground glass B, applied to the exterior of a bee hive around its entrance, or within a hive at suitable places for the purpose specified.

2. The water tank or reservoir C, provided with necessary eduction and induction pipes $e$, $g$, placed within a hive A, substantially as and for the purpose set forth.

DANIEL ARNDT.

Witnesses:
F. A. SEBORN,
JOHN QUIGLEY.